United States Patent
Workman

(10) Patent No.: US 7,379,015 B2
(45) Date of Patent: May 27, 2008

(54) FIRST RESPONDER POSITIONING APPARATUS

(75) Inventor: Dennis Lee Workman, Morgan Hill, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 274 days.

(21) Appl. No.: 11/291,751

(22) Filed: Dec. 1, 2005

(65) Prior Publication Data

US 2007/0126623 A1 Jun. 7, 2007

(51) Int. Cl.
G01S 13/42 (2006.01)
G01S 5/14 (2006.01)
H04B 7/185 (2006.01)

(52) U.S. Cl. .............. 342/126; 342/133; 342/120; 342/107; 342/357.07; 342/357.14

(58) Field of Classification Search ........... 342/42–51, 342/56–59, 121, 125, 126, 133, 139, 140, 342/146, 147, 357.06–357.09
See application file for complete search history.

(56) References Cited

U.S. PATENT DOCUMENTS

| 5,731,757 | A | * | 3/1998 | Layson, Jr. .............. 340/573.1 |
|---|---|---|---|---|
| 5,847,679 | A | * | 12/1998 | Yee et al. .............. 342/357.07 |
| 5,917,444 | A | | 6/1999 | Loomis et al. |
| 5,999,124 | A | | 12/1999 | Sheynblat |
| 6,011,510 | A | * | 1/2000 | Yee et al. .............. 342/357.09 |
| 6,031,454 | A | * | 2/2000 | Lovejoy et al. ........ 340/539.29 |
| 6,430,419 | B2 | | 8/2002 | Loomis |
| 6,531,963 | B1 | * | 3/2003 | Nyfelt ..................... 340/573.1 |
| 6,801,853 | B2 | | 2/2004 | Workman |
| 6,876,326 | B2 | * | 4/2005 | Martorana ................. 342/463 |
| 7,196,659 | B1 | * | 3/2007 | Beason et al. ........... 342/357.1 |
| RE39,909 | E | * | 11/2007 | Taylor, Jr. ............... 340/573.4 |
| 2001/0053699 | A1 | * | 12/2001 | McCrady et al. ........... 455/513 |
| 2005/0192741 | A1 | | 9/2005 | Nichols et al. |
| 2005/0246098 | A1 | | 11/2005 | Bergstrom et al. |
| 2006/0224306 | A1 | * | 10/2006 | Workman et al. ........... 701/207 |
| 2006/0270421 | A1 | * | 11/2006 | Phillips et al. .............. 455/457 |
| 2007/0126623 | A1 | * | 6/2007 | Workman ................... 342/126 |

* cited by examiner

*Primary Examiner*—John B Sotomayor
(74) *Attorney, Agent, or Firm*—Menlo Patent Agency LLC

(57) ABSTRACT

A positioning system for tracking the location of a first responder emergency worker. The system includes mobile enabler units and a personnel badge having a ranging transponder. Two enabler units can use two-way ranging signals, a prescribed turn around time and differential altitude for automatically tracking the location of the badge.

14 Claims, 4 Drawing Sheets

FIRST RESPONDER POSITIONING APPARATUS

BACKGROUND OF THE INVENTION

1. Field of the Invention

The invention relates generally to positioning systems and more particularly to a positioning system for tracking the location of a first responder emergency worker.

2. Description of the Background Art

Recently, there has been great interest in the support of first responder emergency workers after a natural or terrorist disaster has occurred. A primary requirement for supporting the first responder in the field is the knowledge of his or her location. At this time, there is no universal positioning system with the accuracy that is needed that works reliably within buildings.

Current technology requires the first responder to use his or her two-way radio to communicate position. An advantage of this approach is that the first responder does not need to carry any extra positioning hardware. However, this advantage may be less than it seems because the two-way radios of many first responders are incompatible with each other. Further, it requires time and verbal skill to communicate an accurate unambiguous position. For example, the first responder may be situated in a maze that is hard to describe of rooms in the interior of a building. In any case, the first responder may not be able to see his or her position due to smoke or because the disaster has wiped out certain landmarks.

SUMMARY OF THE INVENTION

It is therefore an object of the present invention to provide a first responder positioning apparatus for accurately and automatically reporting a first responder emergency worker's position inside or outside of buildings. The first responder emergency worker wears a badge of the present invention.

In a preferred embodiment the present invention is an apparatus for determining location of a personnel badge, comprising: a personnel badge having a ranging transponder for responding automatically to base ranging signals with respective return ranging signals; a primary enabler having a first location, the primary enabler having a first two-way ranger radio for measuring a first round trip time between transmitting a first of the base ranging signals and receiving a first of the return ranging signals; at least one secondary enabler having a corresponding second location, the secondary enabler having a second two-way ranger radio for determining a second round trip time between transmitting a second of the base ranging signals and receiving a second of the return ranging signals; and a badge locator constructed for determining a location of the badge from positioning information derived using the first and second locations and the first and second round trip times.

Preferably, the badge includes an altimeter for determining a badge altitude; the first return ranging signal carries information for the badge altitude; the primary enabler includes an altimeter for determining a base altitude and providing an altitude difference between the badge altitude and the base altitude; and the badge locator uses the altitude difference in the determination of the badge location.

In another preferred embodiment the present invention is a method for determining location of a personnel badge, comprising: automatically responding at a badge location to base ranging signals with respective return ranging signals; determining a first round trip time between transmitting a first of the base ranging signals and receiving a first of the return ranging signals at a first location; determining a second round trip time between transmitting a first of the base ranging signals and receiving a second of the return ranging signals at a second location; and determining the badge location from positioning information derived using the first and second locations and the first and second round trip times.

Preferably, the method also includes: determining an altitude at the badge location; carrying information for the badge altitude in the first return ranging signal; determining a base altitude at the first location; determining an altitude difference between the badge altitude and the base altitude; and using the altitude difference in the determination of the badge location.

Most radio positioning systems in use today or proposed, including GPS, LORAN, CDMA radio and digital television, use one-way ranging. The two-way ranging of the present invention has the advantage of providing an accurate three dimensional (3D) position of a badge worn by a first responder using as few as two enabler units. A one-way ranging system having otherwise equivalent capabilities would require an additional enabler unit in order to synchronize or resolve the differences between the clocks of the enabler units and the badge. In the two-way ranging of the present invention, the clocks do not need to be resolved or synchronized.

These and other advantages of the present invention will no doubt become obvious to those of ordinary skill in the art after having read the following best mode for carrying out the invention and viewing the various drawings.

BEST MODE FOR CARRYING OUT THE INVENTION

The details of the preferred embodiments for carrying out the idea of the invention will now be presented. It should be understood that the description of these details is not intended to limit the invention to these details. On the contrary these details are only intended to describe the best mode known to the inventor for carrying out the inventor's idea. Numerous alternatives, modifications and equivalents of the embodiments described below will be apparent to someone skilled in the art as within the scope of the idea of this invention.

The invention is described in terms of a preferred embodiment that uses the global positioning system (GPS) having GPS signals modulated with a coarse/acquisition (C/A) code for locating mobile enabler units. However, the idea may be applied with other GPS signal modulations including the P code. Further, the invention may be carried out with a generic global navigation satellite system (GNSS) where the global positioning system (GPS), the global orbiting navigation system (GLONASS), the Galileo system or a combination of these systems provides positioning signals. It should also be noted that pseudolites may be used in place of satellites for broadcasting GNSS positioning signals.

Figure 1:
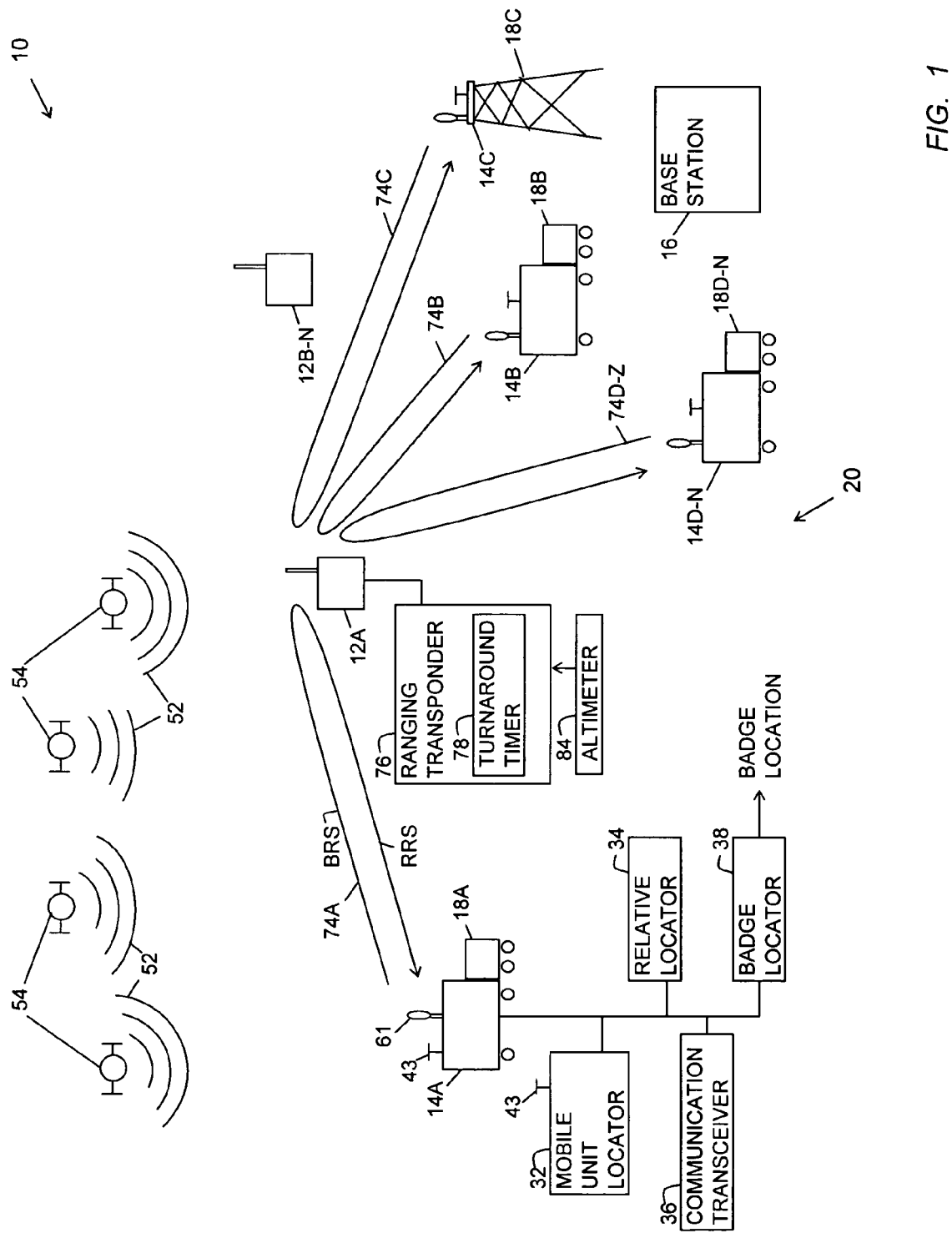
FIG. 1 is a block diagram showing enabler units and a personnel badge for a first responder system of the present invention for determining the location of the badge.

FIG. 1 is a block diagram of a first responder positioning system 10 of the present invention for determining the geographical position of a personnel badge 12A. The badge 12A is intended to be worn by a first responder emergency worker. The system 10 includes the badge 12A and at least two enabler units 14A and 14B. It is envisioned that there will be many emergency workers within radio range where each worker wears his own badge 12B-N and each of the badges 12B-N is located in a similar manner. The system 10 normally also includes additional enabler units 14C and 14D-N. A separate base station 16 may be included in the system 10 for coordinating and providing information to the enabler units 14A-N.

In order to have maximum utility, the enabler units 14A, 14B and 14D-N are designed to be carried individually on vehicles illustrated as 18A, 18B and 18D-N. However, it should be noted that any of the enabler units 14A-N can have a fixed location for an indefinite period of time and the enabler units 14A, 14B and 14D-N are not required to be mounted on vehicles 18A, 18B and 18D-N. For example, the enabler unit 14C is illustrated for being located at a cell tower 18C. The combination of the enabler units 14A-N, the personnel badges 12A-N, and the base 16 is referred to as a first responder positioning apparatus 20.

The elements of the enabler unit 14A are illustrated as representative of the enabler units 14A-N and the elements of the badge 12A are illustrated as representative of the badges 12A-N. In order to simplify the description of the details below, the enabler units 14A-N are referred to as enabler unit 14 and the badges 12A-N are referred to as badge 12.

Figure 2:
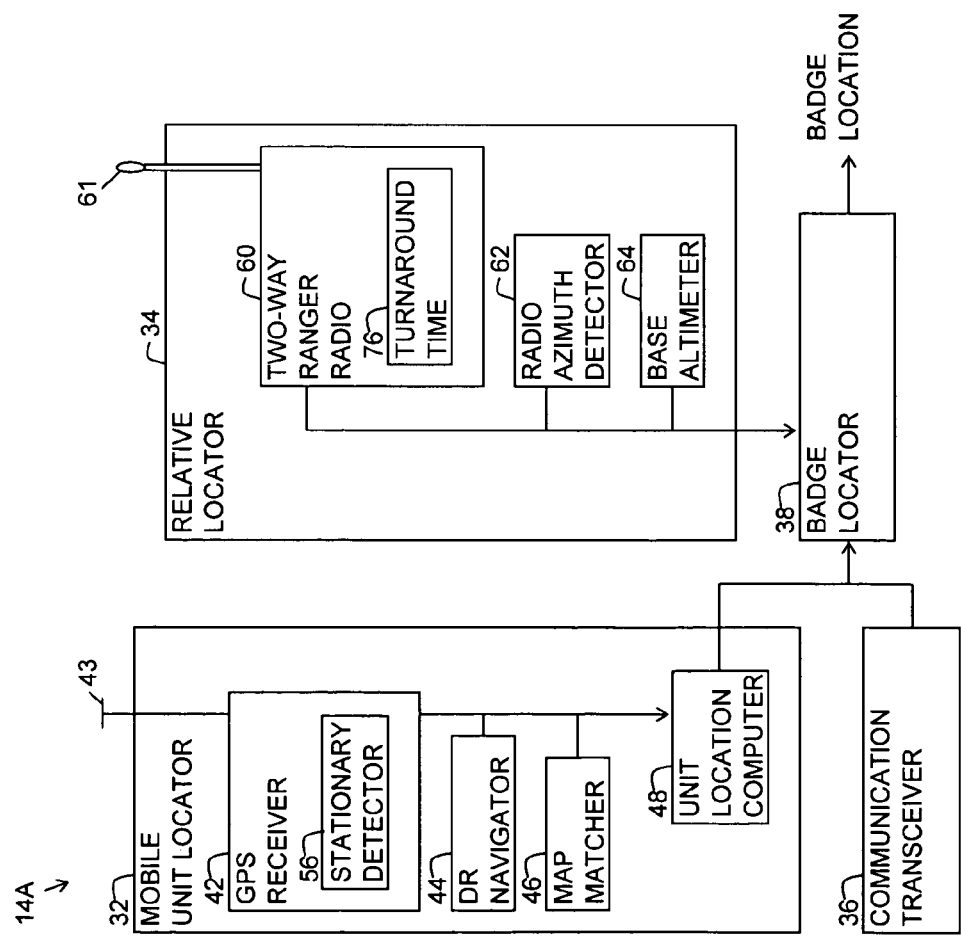
FIG. 2 is a block diagram of a mobile enabler unit of the system of FIG. 1.

The enabler unit 14 includes a mobile unit locator 32, a relative locator 34, a communication transceiver 36, and a badge locator 38. Referring to FIG. 2 the mobile unit locator 32 includes a GPS receiver 42 including a GPS antenna 43, a dead reckoning (DR) navigator 44, a map matcher 46 and a unit location computer 48 having an algorithm for determining geographical location of the enabler unit 14 as described below.

The GPS antenna 43 receives GPS signals 52 that are broadcast by GPS satellites 54. The GPS receiver 42 uses location-determination message information and times-of-arrival of the GPS signals 52 for determining a GPS-based geographic three dimensional (3D) position of the enabler unit 14. Differential or real time kinematic (RTK) GPS techniques may be used for improving the accuracy of the GPS-based position. The acquisition of the GPS signals 52 may be assisted by information from the base 16 such as orbital parameters, precise frequency and/or precise time.

The DR navigator 44 measures changes in position from an initial position. The initial position is entered by a user or derived and updated with positions determined by the unit location computer 48. Such DR navigator 44 may be constructed with devices that measure direction while measuring and integrating speed or with devices that measure and double integrate directional accelerations. Inertial devices may be used for measuring accelerations.

The map matcher 46 includes stored digitized street maps formatted so that positions that are determined by other means can be compared to the known positions of the streets. The unit location computer 48 uses the GPS-based position information and the DR-based position information together with the positions of the streets for computing a best estimate of the geographical position of the enabler unit 14.

In order to provide more accurate geographical positions when the enabler unit 14 is not on a mapped road, for example where a building existed before a disaster destroyed the building, the GPS receiver 42 optionally includes a stationary detector 56 for determining when the enabler unit 14 is not moving.

The unit location computer 48 uses the stationary determination for switching to the exclusive use of the GPS-based positioning information and ignoring newly acquired DR-based and map-based positioning information. Each of the enabler units 14A-N determines its own position. Where the enabler unit 14 is located at a permanent position, such as the position of a cell tower, the elements of the mobile unit locator 32 may be replaced by data for the permanent position.

The relative locator 34 includes a two-way ranger radio 60 including a directional antenna 61, a radio azimuth detector 62, and a base altimeter 64. The directional antenna 61 transmits and receives a two-way ranging signal 74 (illustrated with reference identifiers 74A-N). The two-way ranger radio 60 measures the round trip time between a time-of-transmission of the outgoing or base ranging signal (BRS) 74 and a time-of-arrival of a corresponding return ranging signal (RRS) 74. The round trip time may be obtained by noting the difference in time that is required in order to align a pulse or a modulating code carried on the base and return ranging signals 74. It should be noted that a ranging transponder 76 in the badge 12 preserves this pulse or code when it responds to the base ranging signal BRS with the return ranging signal RRS.

The two-way ranger radio 60 then corrects the time difference by subtracting a prescribed non-zero turnaround time associated with the badge 12 to the time difference that it measures. The corrected time difference is then divided by two and divided by the speed of light for converting to a range (104A and 104B in FIGS. 3A and 3B) between the enabler unit 14 and the badge 12.

The ranging signal 74 carries an enabler unit identification (ID) so that its return signal (RRS) can be distinguished from the return signals originating among the return signals for all the enabler units 14A-N. This ID may be in the form of a modulation code. The badge 12 adds its ID to the return signal (RRS) so that one badge 12 can be distinguished from another when there are several badges 12A-N within radio range.

The directional antenna 61 provides information for a relative direction of the return signal with respect to a reference azimuth of the antenna 61. The azimuth detector 62 uses the relative direction information with information for the reference azimuth in order to determine an absolute azimuth (114 in FIG. 3B) from the enabler unit 14 to the badge 12. The directional antenna 61 can be constructed with a rotating antenna or with multiple antenna elements. The reference azimuth may be determined with an electronic compass.

The badge 12 includes the ranging transponder 76, a turnaround timer 78 and a badge altimeter 84. The altimeter 84 determines an altitude at the badge 12. The ranging transponder 76 receives the ranging signals 74A-N, adds to the signal or modifies the signal for the altitude information and an identification (ID) that is unique to the particular badge 12, and transmits the return ranging signals RRS at the prescribed turnaround time after the ranging signals 74A-N were received. The turnaround timer 78 controls the ranging transponder 76 to ensure that the prescribed turnaround time is maintained. The prescribed turnaround time may be greater than 100 nanoseconds with an accuracy of better than about 10 nanoseconds and preferably better than 3 nanoseconds.

The base altimeter 64 uses the badge altitude information in the return signal RRS for determining an altitude difference (108 in FIG. 3A) between the enabler unit 14 and the badge 12. Barometric pressures can be used by the altimeters 64 and 84 for determining the altitudes.

The communication transceiver 36 transmits information for the geographical position of the enabler 14 and the range of the badge 12 to the other enabler units 14A-N and receives information for the geographical enabler positions and ranges from the other enabler units 14A-N, and optionally the differential altitudes and azimuths. The enabler units 14A-N may be in direct communication or in communication through the base 16.

The badge locator 38 includes an algorithm for computing a three dimensional (3D) geographical position of the badge 12 from the 3D geographical positions of the enabler units 14A-N and the ranges to the badge 12 with respect to the same enabler units 14A-N, the differential altitudes, and the azimuths. In a best mode, only two enabler unit locations, two ranges from the same enabler units, one differential altitude and one azimuth are required. Additional enabler unit locations, ranges, altitudes and/or azimuths can be used in an overdetermined solution in order to improve the accuracy and reliability of the badge location. Three enabler unit locations may be used for determining the badge location without the use of altitude and/or azimuth information.

The communication transceiver 36 transmits position information for the badge 12 to the base station 16. The base station 16 may be equipped with geocoding and/or digital building drawings for translating the geographical location of the badge 12 to addresses, floors and even room identifications. The addresses, floors and room identifications can be passed back to the enabler unit 14 through the communication transceiver 36.

In order to reduce multipath ranging errors, the two-way ranger radio 60 and the transponder 76 may transmit and receive the two-way ranging signals 74A-N in a communication format known as ultra wide band (UWB) transmission. A spread spectrum format such as code division multiple access (CDMA) or frequency hopping may also be used. The CDMA and frequency hopping signals have the further advantage that the code or the frequency hop sequence may be used for the IDs of the enablers 14A-N and/or the badges 12A-N.

It should be noted that the algorithms described herein are operated by hardware computing devices using microprocessors, memory, logic gates, digital signal processing (DSP) devices and the like for processing information in a digital form. In a preferred embodiment the algorithms are programmed and encoded onto a tangible medium in a form that is readable by a computer or computing device such as a microprocessor.

Figure 3B:
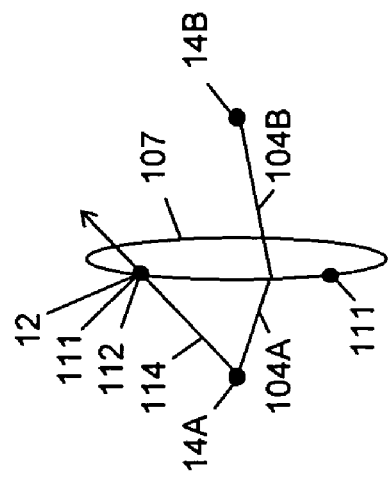
FIGS. 3A and 3B are side and top views, respectively, of a positioning diagram for the system of FIG. 1.
Figure 3A:
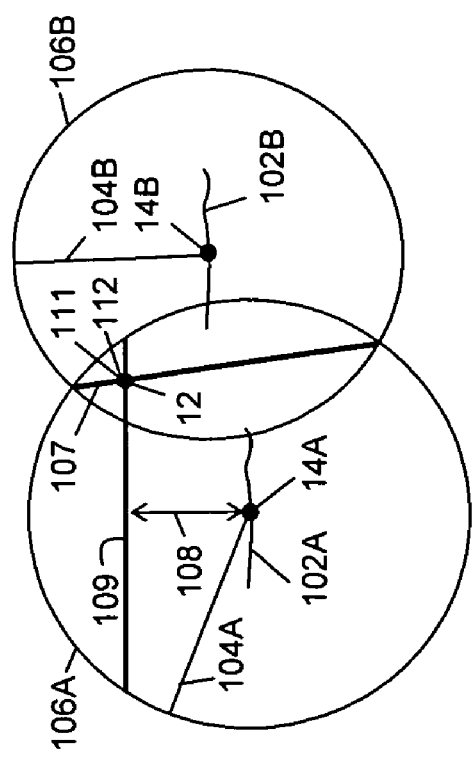

FIGS. 3A and 3B are a horizontal and a top views, respectively, of a positioning diagram for the enabler apparatus 20 of the present invention. The horizontal view FIG. 3A is shown, without loss of generality, perpendicular to a line that includes the locations of the enabler units 14A and 14B. The enabler units 14A and 14B are positioned on ground 102A and 102B. First and second ranges 104A and 104B are computed from the round trip times of the respective two-way ranging signals 74A and 74B between the respective enabler units 14A and 14B and the badge 12. The ranges 104A and 104B generate first and second position spheres 106A and 106B, respectively, of possible locations of the badge 12. The possible badge locations satisfying both position spheres 106A and 106B is a first position circle 107.

A differential altitude or height 108 is obtained from the difference between the altitude of the badge 12 and the altitude of the enabler 14A. The possible badge locations satisfying the height 108 and the sphere 106A is a second position circle 109. The position circles 107 and 109 intersect at two possible badge location points 111. One of the two possible location points 111 is a correct location 112 of the badge 12.

The top view FIG. 3B shows the two location points 111 on circles 107, 109. The azimuth vector 114 can be used to determine which of the locations points 111 is the correct location 112. In order to determine the badge location 112, a primary enabler 14A needs only the geographical locations of the enabler units 14A and 14B, the ranges 104A and 104B, the height 108, and an approximate angle for the azimuth 114. It should be noted that this positioning information may be embodied in various equation and tabular formats. For example, the location of a secondary enabler 14B and the range 104B may be communicated to the primary enabler 14A as the equation for the position sphere 106B. It should also be noted that a height between the badge 12 and the enabler unit 14B may be substituted for the height 108, and/or an azimuth from the enabler 14B to the badge 12 may be substituted for the azimuth 114.

Alternatively, a third range is computed from the round trip time of a third two-way ranging signal between a third enabler unit and the badge 12. The location of the third enabler unit and the third range generate a third position sphere. The third position sphere intersects the first and second position spheres at two points. In some cases one of the two points may be eliminated as not possible, for example by being underground or moving too rapidly, thereby indicating the other point as the correct position 112. Or, a single approximate azimuth or approximate differential height can be used to determine which of the two points is the correct position 112.

The solution of the badge location 112 can be overdetermined by providing additional positioning information such as locations and ranges for one or more additional enablers 14C-N, heights between the badge 12 and one or more additional enablers 14C-N and/or azimuths from one or more additional enablers 14C-N to the badge 12.

Figure 4:
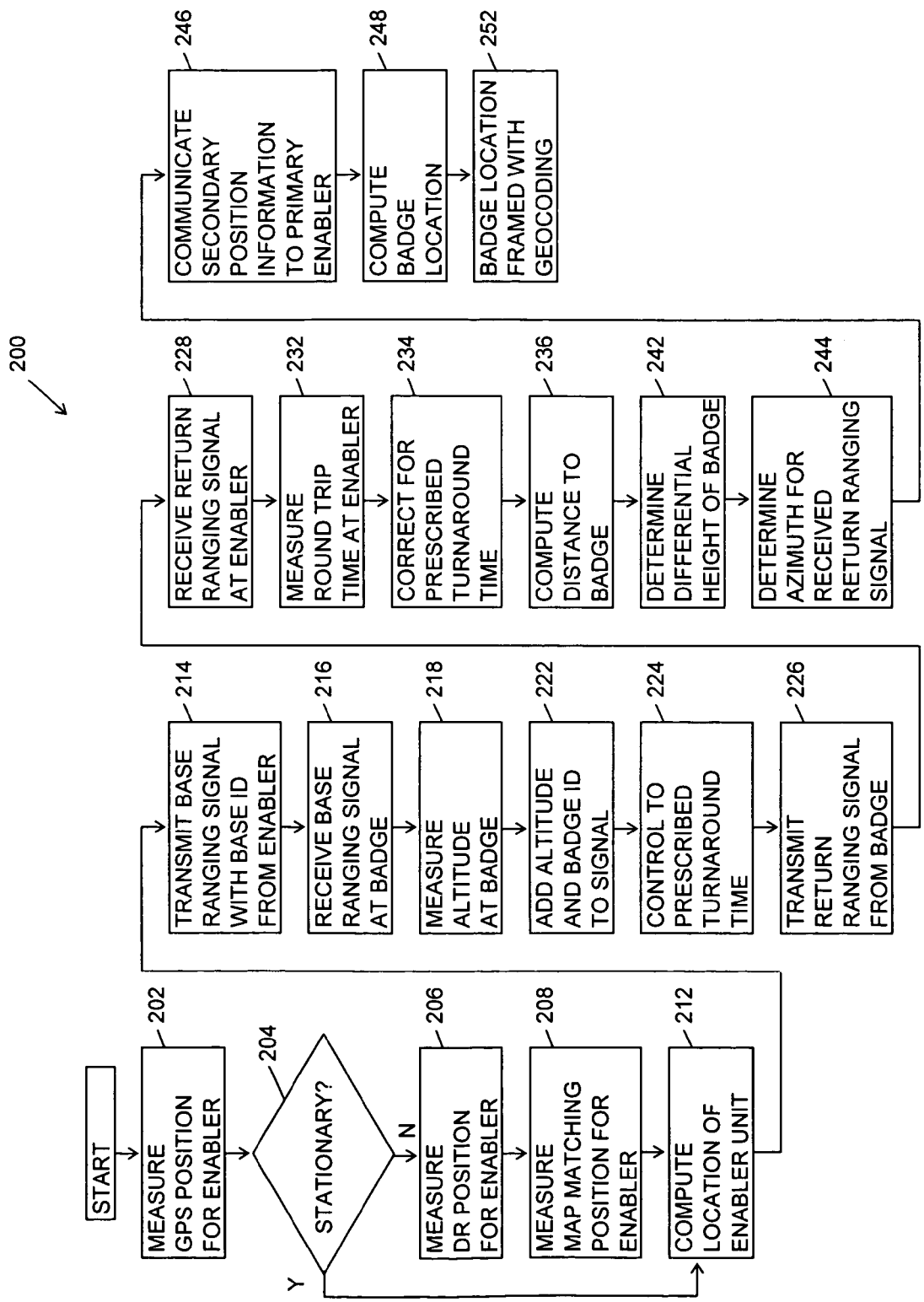
FIG. 4 is a flow chart of a method of the present invention for determining the location of the badge of FIG. 1.

FIG. 4 is a flow chart of a method of the present invention for tracking the position of a first responder worker. Certain steps of the method may be embodied in tangible medium 200 readable by a computer device for carrying out steps of the method. At the start, a primary and at least one secondary enabler unit is deployed. At least one first responder emergency worker is wearing a badge having a ranging transponder. In a step 202 the primary enabler unit receives global positioning system (GPS) signals for determining a GPS position. In a step 204 when the primary enabler unit is determined to be stationary, the GPS position is used for computing the location of the primary enabler unit.

Otherwise, in a step 206 the primary enabler unit uses dead reckoning techniques for updating position based upon a previous position. In a step 208 the GPS and DR position information is compared with digital street maps. Then in a step 212 the primary enabler unit makes a best estimate of its location. A similar procedure is followed by one or more secondary enabler units. Alternatively, the enabler units can have known permanent geographical locations or a mix of mobile and permanent locations.

The primary and secondary enabler units transmit first and second base ranging signals with respective enabler identifications in a step 214. In a step 216 the base ranging signals are received by the badge. In a step 218 the badge measures its altitude. In a step 222 the badge modulates or otherwise adds its altitude and a badge identification to the signals. In a step 224 a delay time is controlled to have a prescribed non-zero turnaround time in the badge. Then at a step 226 the badge transmits the first return ranging signal at the prescribed turnaround time after receiving the first base ranging signal and transmits the second return ranging signal at the prescribed turnaround time after receiving the second base ranging signal, and so on for additional return and base ranging signals.

The first return ranging signal is received at the primary enabler unit and the second return ranging signal is received at the secondary enabler unit and so on for additional enabler units in a step 228. There may be more than one badge in the field. The various return ranging signals are distinguished from each other by the enabler identifications and the badge ID's. In a step 232 the enabler units measure respective round trip times between transmitting and receiving the base and return ranging signals. In a step 234 the round trip times are corrected by subtracting the prescribed turnaround times. Then in a step 236 the corrected round trip times are converted to distance by dividing by two and dividing by the speed of light.

The primary enabler unit, in a step 242 measures its own base altitude and takes the difference between the badge altitude and the base altitude for determining the differential height or altitude of the badge. In a step 244 the azimuth is determined where the return ranging signal is received. In a step 246 the primary enabler unit receives position information determined by secondary enabler units. The position information may be communicated directly from one enabler unit to another or through a separate base station. Then in a step 248 the primary enabler unit determines the location of the badge. Finally in a step 252 the badge location may be converted with geocoding into address, floor and room information.

Although the present invention has been described in terms of the presently preferred embodiments, it is to be understood that such disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An apparatus for determining location of a personnel badge, comprising:
    a personnel badge having a ranging transponder for responding automatically to base ranging signals with respective return ranging signals;
    a primary enabler having a first location, the primary enabler having a first two-way ranger radio for measuring a first round trip time between transmitting a first of said base ranging signals and receiving a first of said return ranging signals;
    at least one secondary enabler having a corresponding second location, the secondary enabler having a second two-way ranger radio for determining a second round trip time between transmitting a second of said base ranging signals and receiving a second of said return ranging signals;
    a badge locator constructed for determining a location of the badge from positioning information derived from said first and second locations and said first and second round trip times; and wherein:
    the primary enabler includes a stationary detector configured to provide a stationary override to cause certain new position information to be ignored for determination of said first location when said stationary detector detects the primary enabler is stationary.

2. The apparatus of claim 1, wherein:
    the badge includes an altimeter for determining a badge altitude;
    said first return ranging signal carries information for said badge altitude;
    the primary enabler includes an altimeter for determining a base altitude and providing an altitude difference between said badge altitude and said base altitude; and
    the badge locator uses said altitude difference in the determination of said badge location.

3. The apparatus of claim 2, wherein:
    the primary enabler includes an azimuth detector for determining an azimuth at which said first return ranging signal is received; and
    the badge locator uses said azimuth in the determination of said badge location.

4. The apparatus of claim 3, wherein:
    said apparatus is constructed for determining said badge location using information for said first and second locations with no other time, distance, direction, speed, acceleration or position information except time, distance, direction, speed, acceleration or position information based on said first and second round trip times, said altitude difference and said azimuth.

5. The apparatus of claim 1, further comprising:
    a turnaround timer for controlling said ranging transponder for transmitting said first return ranging signal at a non-zero prescribed turnaround time after receiving said first base ranging signal; and wherein:
    the badge locator uses said prescribed turnaround time in the determination of said first round trip time.

6. The apparatus of claim 1, wherein:
    the primary enabler includes a global positioning system (GPS) receiver for providing GPS position information; a dead reckoning (DR) navigator for providing DR position information; a map matcher for providing map matching position information; and a unit location computer for using said GPS position information, said DR position information, and said map matching position information in combination for determining said first location.

7. An apparatus for determining location of a personnel badge, comprising:
    a personnel badge having a ranging transponder for responding automatically to base ranging signals with respective return ranging signals;
    a primary enabler having a first location, the primary enabler having a first two-way ranger radio for measuring a first round trip time between transmitting a first of said base ranging signals and receiving a first of said return ranging signals;
    at least one secondary enabler having a corresponding second location, the secondary enabler having a second two-way ranger radio for determining a second round trip time between transmitting a second of said base ranging signals and receiving a second of said return ranging signals;

a badge locator constructed for determining a location of the badge from positioning information derived from said first and second locations and said first and second round trip times; and a stationary detector for providing a stationary override when GPS position information indicates the primary enabler is stationary; and wherein:

the primary enabler includes a global positioning system (GPS) receiver for providing said GPS position information; a dead reckoning (DR) navigator for providing DR position information; a map matcher for providing map matching position information; and a unit location computer for using said GPS position information, said DR position information, and said map matching position information in combination for determining said first location; and said unit location computer is coupled to the stationary detector for ignoring at least one of new said DR position information and new said map matching position information in the determination of said first location when said GPS stationary override is received.

8. A method for determining location of a personnel badge, comprising:

automatically responding at a badge location to base ranging signals with respective return ranging signals;

determining a first round trip time between transmitting a first of said base ranging signals and receiving a first of said return ranging signals at a first location;

determining a second round trip time between transmitting a first of said base ranging signals and receiving a second of said return ranging signals at a second location; and determining said badge location from positioning information derived using said first and second locations and said first and second round trip times;

detecting when said first location is stationary for providing a stationary override; and causing certain new position information to be ignored in response to said stationary override for determination of said first location.

9. The method of claim 8, further comprising:
determining an altitude at said badge location;
carrying information for said badge altitude in said first return ranging signal;
determining a base altitude at said first location;
determining an altitude difference between said badge altitude and said base altitude; and
using said altitude difference in the determination of said badge location.

10. The method of claim 9, further comprising:
determining an azimuth at which said first return ranging signal is received; and
using said azimuth in the determination of said badge location.

11. The method of claim 10, wherein:
the step of determining said badge location uses information for said first and second locations with no other time, distance, direction, speed, acceleration or position information except time, distance, direction, speed, acceleration or position information based on said first and second round trip times, said altitude difference and said azimuth.

12. The method of claim 8, wherein:
the step of automatically responding includes transmitting said first return ranging signal at a non-zero prescribed turnaround time after receiving said first base ranging signal; and
the step of determining said first round trip time includes correcting said first round trip time with said prescribed turnaround time.

13. The method of claim 8, further comprising:
determining GPS position information at said first location;
determining dead reckoning (DR) position information at said first location;
determining map matching position information at said first location; and
combining said GPS position information, said DR position information, and said map matching position information for the determination of said first location.

14. A method for determining location of a personnel badge, comprising:

automatically responding at a badge location to base ranging signals with respective return ranging signals;

determining a first round trip time between transmitting a first of said base ranging signals and receiving a first of said return ranging signals at a first location;

determining a second round trip time between transmitting a first of said base ranging signals and receiving a second of said return ranging signals at a second location;

determining said badge location from positioning information derived using said first and second locations and said first and second round trip times;

determining GPS position information at said first location;

determining dead reckoning (DR) position information at said first location;

determining map matching position information at said first location;

combining said GPS position information, said DR position information, and said map matching position information for the determination of said first location;

using said GPS position information for determining when said first location is stationary; and wherein:

the step combining includes ignoring at least one of new said DR position information and new said map matching position information for the determination of said first location when said first location is determined to be stationary.

* * * * *